May 5, 1936.     C. F. ROSSETTER     2,039,665
REVERSING TRANSMISSION
Filed July 30, 1934
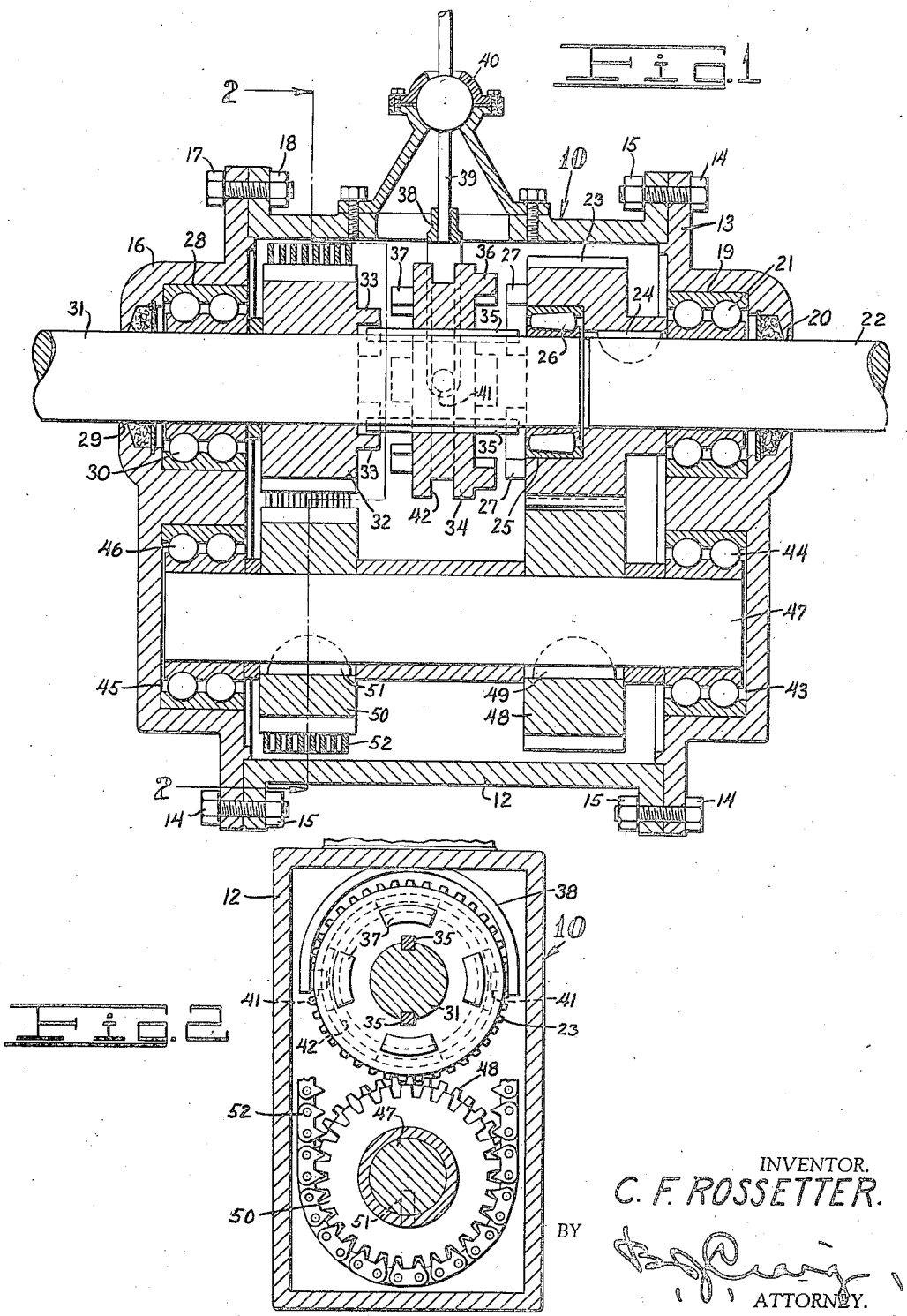
INVENTOR.
C. F. ROSSETTER.
ATTORNEY.

Patented May 5, 1936

2,039,665

UNITED STATES PATENT OFFICE 2,039,665

REVERSING TRANSMISSION

Charles F. Rossetter, Eagle Rock, Calif., assignor to Paul Hawkins, Hollywood, Calif.

Application July 30, 1934, Serial No. 737,536

1 Claim. (Cl. 74—376)

This invention relates to improvements in reversing transmissions.

The general object of the invention is to provide an improved transmission which includes a drive shaft and a driven shaft with novel means to rotate the driven shaft in either of two directions from the drive shaft.

Other objects and the advantages of the invention will be apparent from the following description taken in connection with the accompanying drawing wherein:

Fig. 1 is a central vertical section through my improved transmission device; and, Fig. 2 is a section taken on line 2—2 of Fig. 1 on a reduced scale.

Referring to the drawing by reference characters I have indicated my improved transmission device generally at 10. As shown the device 10 includes an open ended housing 12 closed at one end by a cap member 13 which is secured to the housing by bolts 14 and nuts 15. The other end of the housing 12 is closed by a similar cap member 16 which is secured to the housing by bolts 17 and nuts 18.

The cap 13 includes a recess 19 in its inner face and a co-axially reduced aperture 20 which communicates with the recess 19. Positioned in the recess 19 I provide an anti-friction bearing 21 and supported in the bearing 21 I provide a drive shaft 22. The drive shaft 22 extends out of the housing through the aperture 20 in the cap member 13 and may be driven in any desired manner.

Positioned on the shaft 22 in the housing 12 I provide a gear 23 which is shown as secured to the shaft 22 by a key 24. In the face of the gear 23 opposite the bearing 21 the gear includes a recess 25 which is coaxial with the shaft 22 and positioned in the recess 25 I provide an anti-friction bearing 26. Extending from the face of the gear 23 adjacent the recess 25 I provide a plurality of lugs 27 which form one portion of a clutch.

The cap member 16 includes a recess 28 in its inner face and a reduced aperture 29 both of which are coaxial with the drive shaft 22. Positioned in the recess 28 I provide an anti-friction bearing 30 and supported in the bearing 30 I provide a driven shaft 31. The shaft 31 extends out of the housing through the aperture 29 in the cap member 16 and may be coupled to drive any type of device wherein it is desired to drive the device in one direction at one time and in the opposite direction at other times.

The shaft 31 extends inward from the bearing 30 and is supported in the bearing 26 of the gear 23. Rotatably mounted on the shaft 31 adjacent the cap 16 I provide a silent chain sprocket 32. Extending from the face of the sprocket 32 towards the gear 23 I provide a plurality of lugs 33 which form one portion of a clutch.

Mounted on the shaft 31 intermediate the gear 23 and the sprocket 32 I provide a clutch spool 34. The spool 34 is slidable on the shaft 33 and is connected to the shaft 34 for rotation therewith by splines 35. Extending from one face of the spool towards the gear 23 I provide a plurality of lugs 36 which are adapted to coact with the lugs 27 on the gear 23 to drive the spool from the gear 23. Extending from the other face of the spool towards the sprocket 32 I provide a plurality of lugs 37 which are adapted to coact with the lugs 33 on the sprocket 32 to drive the spool from the sprocket.

For shifting the spool 34 either into engagement with the gear 23 or the sprocket 32 I provide a shifting yoke 38 which is mounted on a rod 39. The rod 39 is shown as extending out of the housing through the medium of a ball and socket pivot indicated at 40. The yoke 38 straddles the spool 34 and includes opposed pins 41 which are positioned in an annular groove 42 provided in the spool 34.

Spaced below the recess 19 the cap 13 includes a recess 43 in which an anti-friction bearing 44 is positioned and spaced below the recess 28 the cap 16 includes a recess 45 which is coaxial with the recess 43 of the cap 13. In the recess 45 I provide an anti-friction bearing 46.

Supported in the bearings 44 and 46 I provide a shaft 47. Mounted on the shaft 47 adjacent the cap 13 I provide a gear 48 which meshes with the gear 23. The gear 48 is shown as secured to the shaft 47 by a key 49. Mounted on the shaft 47 adjacent the cap 16 I provide a silent chain sprocket 50 which is shown as secured to the shaft by a key 51. The sprocket 50 is operatively connected to the sprocket 32 by an endless silent chain 52.

When the drive shaft 22 is rotated it rotates the gear 23 which drives the gear 48 which in turn rotates the shaft 47 in a direction opposite to the direction of rotation of the shaft 22. The shaft 47 rotates the sprocket 50 which through the medium of the chain 52 rotates the sprocket 32 in a direction opposite to the direction of rotation of the drive shaft 22. Thus when the clutch spool 34 is shifted to the right in Fig. 1 the lugs on the gear 23 fit between the lugs 26 on the spool and turn the spool with the gear 23 in the same direction of rotation as that of the drive shaft 22 and through the medium of the splines 35 the spool 34 will rotate the shaft 31 in the same direction of rotation as the direction of rotation of the drive shaft 22.

When the clutch spool 34 is shifted to the left in Fig. 1 the lugs 37 on the spool 34 fit between the lugs 33 on the sprocket 32 to thus rotate the spool in a direction opposite to the direction of rotation of the drive shaft 22 and through the medium of the splines 35 the spool 34 will rotate the shaft 31 in a direction opposite to the direction of rotation of the drive shaft.

From the foregoing description it will be apparent that I have provided a novel reversing transmission device which is simple in construction and highly efficient in operation.

Having thus described my invention, I claim:

In a reversible drive device, a housing, said housing being rectangular in transverse cross section, and having unobstructed, open ends, said housing having a pair of identical cap members one at each end, each of said cap members having a pair of cylindrical recesses therein, anti-friction bearings having their outer members fitted in said recesses, a drive shaft and a driven shaft journalled in certain of said bearings, said shafts having plane adjacent end portions and having equal diameters, a gear on said drive shaft within said housing, said gear being secured to said drive shaft and having clutch means secured thereon, said gear having a cylindrical recess adjacent to said clutch means, said drive shaft terminating at said last mentioned recess, an anti-friction bearing having its outer member mounted in said gear recess and arranged coaxial with said drive shaft, said driven shaft being journalled in said anti-friction bearing in said gear recess and terminating flush with the end of said last mentioned bearing, a jack shaft journalled in said other bearings, a gear mounted on and secured to said jack shaft, said jack shaft gear and said drive shaft gear being in mesh, a chain sprocket mounted on and secured to said jack shaft, a second chain sprocket rotatably mounted on said driven shaft, said second chain sprocket having clutch means thereon, an endless sprocket chain connecting said two sprockets, said chain having its two reaches parallel to and closely adjacent to the parallel side walls of said housing, a clutch spool mounted on said driven shaft between said drive shaft gear and said driven shaft sprocket, said clutch spool being axially movable on said driven shaft and being secured thereto for rotation therewith, means to shift said clutch spool, clutch means on said spool adapted to engage the clutch means on said drive shaft gear whereby said drive shaft gear drives said spool, and other clutch means on said spool adapted to engage with clutch means on said driven shaft sprocket whereby said driven shaft sprocket drives said spool.

CHARLES F. ROSSETTER.